April 28, 1931. W. MESSERSCHMITT 1,803,030

SINGLE SPAR AIRCRAFT WING

Filed July 15, 1929

Inventor:
Willy Messerschmitt
By
Attorneys.

Patented Apr. 28, 1931

1,803,030

UNITED STATES PATENT OFFICE

WILLY MESSERSCHMITT, OF AUGSBURG, GERMANY

SINGLE-SPAR AIRCRAFT WING

Application filed July 15, 1929, Serial No. 378,394, and in Germany May 16, 1928.

Figure 1:
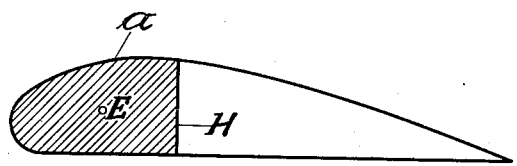
Fig. 1 is a diagram of an airplane wing, indicating the position of the single spar and the elastic line or axis.

It is known to build wings, the bending forces of which are taken up in any flying position by a spar whilst the torsional forces due to the movement of the centre of pressure are taken up by the nose or tip of the wing. During the twisting or torsion, the spar of the wing represents a wall of the twisting body (Figure 1). Here H is the spar, E the elastic axis of the turning body. On a decrease in the angle of incidence or setting, the pressure travels to the rear. The spar H is then exposed not only to bending stresses but also to stresses as part of the torsion body. When the spar is situated in the foremost centre of pressure, that is to say in the centre of pressure of the angle of incidence when changing from gliding to climbing, the wing will not be exposed to torsion but only to bending, and no torsional stresses, but only bending stresses will act on the spar. When the pressure shifts backwards (for instance gliding flight), the spar will receive both bending stresses and the loads corresponding to the moment, as part of the torsion body. The bending stresses and the torsional stresses of the spar are added together so that in certain conditions the spar will have to be built stronger than for purely bending forces.

It is further known that the bending stresses in the spar of a wing reach a maximum at the greatest angle of incidence (change to climbing). For a smaller angle of incidence (gliding flight, travelling flight) the bending stresses are smaller but the spar is then exposed to additional stresses due to torsion. It is therefore possible that the stresses in the spar will be greater during the gliding flight (bending and torsion of the wing) than when climbing.

Figure 2:
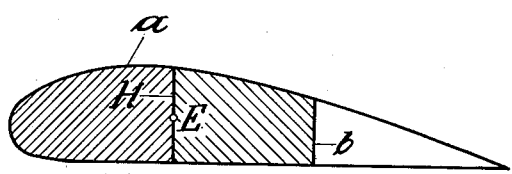
Fig. 2 is a similar diagram showing a preferred form of the invention with rear partition walls.

In order to avoid this, according to the invention the spar is not made as the wall of the torsion body (Figure 2), but the torsion body is extended aft of the spar, namely in such a manner that a box is formed which is enclosed partly by the wing plating $a$, and partly by a sheet metal wall $b$. The rear sheet metal wall $b$ is used merely as a wall of the box and cannot take up any substantial bending stresses. The elastic line of the torsional body is situated in the spar which can never receive stresses from the torsion.

When an airplane wing has no external bracing by struts, etc., it is exposed to: (1) a bending strain in a vertical plane as the wing tip tends to move relatively upward with respect to the body under the effect of the air pressure beneath it or the vacuum above; (2) a bending strain in a horizontal plane as the wing tip is forced back by the air pressure against the edge of the wing; (3) a torsional or twisting strain about a horizontal axis of the wing, (e. g., at a right angle to the direction of flight), this latter horizontal axis being hereinafter called the "elastic line" and moving relatively from front to rear or vice versa according to flight conditions.

The wing itself is a girder and resists bending and torsion to a certain extent, being well adapted in the ordinary construction to resist bending in the horizontal plane: but it is usually reinforced by a spar or spars extending transversely of the airship to resist bending in the vertical plane, for which purpose the spar is made deep, i. e., it extends from the upper to the lower supporting surface of the wing.

The width of the wing from front to back strengthens it against bending in a vertical plane. When the elastic line E (Fig. 1) is in front of the spar H, the torsional twisting of the wing as a whole, about the elastic line as an axis, exposes the spar to a bending strain depending upon the distance from the line E to the spar H, and to a slight twisting. As the elastic line E moves rearward, the bending strain upon the spar H gradually decreases as the distance becomes less, while the twisting strain becomes greater and greater, until in the position of Fig. 2, in which the elastic line E lies in the spar H. The latter is subjected substantially only to a twisting or torsional strain as a result of the twisting of the wing itself (disregarding for the moment the bending strain described under (2) above).

If the single spar is made thick enough horizontally from front to rear to resist this torsion, it must be heavy: and the additional thickness thus provided does not greatly stiffen the spar in its true function of resisting bending in the vertical plane. The same difficulty of weight exists where two spars are provided.

According to the present invention, however, the wing structure is formed with a box not only to resist bending in the horizontal plane, but also to resist torsional twisting in the wing, and the single spar is protected from excessive torsional strains, so that the entire assembly may be constructed of smaller and lighter elements than under former types of arrangement.

For this purpose, the wing coverings including the ribs or surfaces or both are preferably employed as parts of this torsion-resisting box, while the spar is spaced between the front and rear of the box, being preferably equidistant therefrom.

Figure 3:
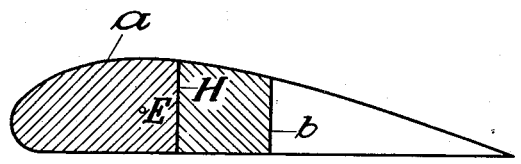
Figs. 3 and 4 are corresponding views showing a modified position of the spar with respect to the elastic line or axis.
Figure 4:
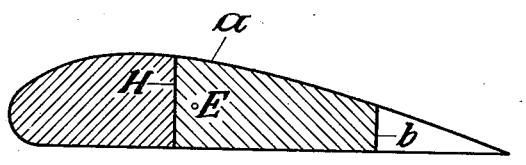
Figure 5:
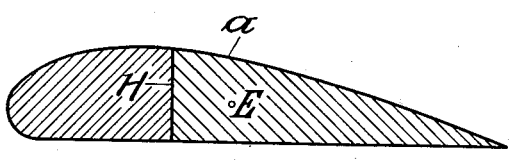
Fig. 5 is a further modified form.

It is not however absolutely essential that no torsional stresses should act on the spar. On the contrary as torsional stresses appear only when the bending stresses are small, the spar may take up also as much torsional stresses as are equal to the difference between the greatest bending stresses (climbing) and the smaller bending stresses (gliding flight). The spar need not therefore be situated absolutely in the elastic line of the torsional body, but may be situated so far in front of (Figure 4) or behind (Figure 3) the elastic line that it takes up part of the torsional forces. This corresponds therefore to a body which is built up of two partial bodies which have different resistance to torsion. This case occurs when, with otherwise the same or similar dimensions of the box situated in front of or behind the spar, the thicknesses of wall are different, which is frequently advisable for reasons of weight owing to the different air forces distributed over the depth of the wing. It goes without saying that the whole outer skin of the wing may be considered as a torsional body so that the partition $b$ may be omitted (Figure 5).

What I claim is:

1. A cantilever airplane wing structure comprising a single spar to resist bending strains and a box to resist torsional stress, said spar being located within the box substantially at the elastic axis of the wing and being relieved by the box of excessive torsional strains, the wing covering members being rigid and secured to said spar and constituting upper and lower parts of said box.

2. A wing structure as in claim 1, in which the rear wall of the box is a plate connecting the top and bottom wing coverings and located substantially as far to the rear of the spar as the front edge of the wing is in front of said spar.

In testimony whereof I have signed my name to this specification.

WILLY MESSERSCHMITT.